(12) United States Patent
Koch

(10) Patent No.: US 10,484,391 B2
(45) Date of Patent: Nov. 19, 2019

(54) METHOD AND SYSTEM FOR PROVIDING SECURE POINT-TO-POINT COMMUNICATION

(71) Applicant: Rohde & Schwarz GmbH & Co. KG, Munich (DE)

(72) Inventor: Christoph Koch, Zollikofen (CH)

(73) Assignee: ROHDE & SCHWARZ GMBH & CO. KG, München (DE)

(*) Notice: Subject to any disclaimer, the term of this patent is extended or adjusted under 35 U.S.C. 154(b) by 11 days.

(21) Appl. No.: 14/827,868

(22) Filed: Aug. 17, 2015

(65) Prior Publication Data
US 2017/0054733 A1   Feb. 23, 2017

(51) Int. Cl.
*H04L 29/06* (2006.01)
*G06F 9/44* (2018.01)

(52) U.S. Cl.
CPC .............. *H04L 63/105* (2013.01); *G06F 9/44* (2013.01); *H04L 63/10* (2013.01); *H04L 63/20* (2013.01); *H04L 63/101* (2013.01)

(58) Field of Classification Search
CPC ....... H04L 63/105; H04L 63/20; H04L 63/10; H04L 63/101; G06F 9/44
See application file for complete search history.

(56) References Cited

U.S. PATENT DOCUMENTS

| | | | | |
|---|---|---|---|---|
| 5,850,444 A * | 12/1998 | Rune | ..................... | G06Q 20/027 380/30 |
| 6,526,506 B1 * | 2/2003 | Lewis | ..................... | H04L 9/083 380/278 |
| 2002/0181395 A1 * | 12/2002 | Foster | ................... | H04L 49/357 370/229 |
| 2003/0051132 A1 * | 3/2003 | Kobayashi | .......... | H04L 63/0428 713/153 |
| 2008/0305766 A1 * | 12/2008 | Falk | ........................ | H04L 63/20 455/410 |
| 2009/0310786 A1 * | 12/2009 | Zhang | ...................... | H04K 1/00 380/270 |
| 2010/0167765 A1 * | 7/2010 | Sarmah | ............... | H04L 12/5895 455/466 |
| 2010/0279653 A1 * | 11/2010 | Poltorak | ............... | H04M 15/00 455/410 |
| 2012/0159149 A1 * | 6/2012 | Martin | ................ | H04L 63/0823 713/151 |
| 2012/0176237 A1 * | 7/2012 | Tabe | .................... | A61B 5/6804 340/539.12 |

(Continued)

*Primary Examiner* — Cheng-Feng Huang

(74) *Attorney, Agent, or Firm* — Westman, Champlin & Koehler, P.A.

(57) ABSTRACT

A communication system for providing secure point-to-point communication comprising a communication network, a first client device and a second client device configured to communicate with each other via communication network, wherein each of the first and second client devices is adapted to run a selected communication application using a communication service provided by the communication network to communicate with each other, wherein the communication application which provides the highest communication service security level is selected from a group of communication applications using communication services with different communication service security levels and being available on the first and second client devices.

7 Claims, 4 Drawing Sheets

(56) References Cited

U.S. PATENT DOCUMENTS

| | | | |
|---|---|---|---|
| 2013/0067535 A1* | 3/2013 | Kang | H04W 48/18 |
| | | | 726/3 |
| 2014/0018060 A1* | 1/2014 | Tuck | H04W 4/008 |
| | | | 455/420 |
| 2014/0059443 A1* | 2/2014 | Tabe | H04L 51/32 |
| | | | 715/738 |
| 2014/0089205 A1* | 3/2014 | Kapur | G06Q 20/40 |
| | | | 705/72 |
| 2014/0245014 A1* | 8/2014 | Tuck | H04L 12/282 |
| | | | 713/171 |
| 2015/0150073 A1* | 5/2015 | Bhalerao | H04L 63/20 |
| | | | 726/1 |
| 2015/0271557 A1* | 9/2015 | Tabe | H04N 21/4788 |
| | | | 725/14 |

* cited by examiner

METHOD AND SYSTEM FOR PROVIDING SECURE POINT-TO-POINT COMMUNICATION

FIELD OF THE INVENTION

The present invention relates to a system and method for providing secure point-to-point communication over a communication network between client devices.

TECHNICAL BACKGROUND

Users can choose between a wide variety of conventional communication services when communicating with each other via a communication network. These communication services include voice and text communication services. Text communication services comprise for instance email communication services or short message text communication services. Further, a user can also use a voice communication, in particular a conventional telephone service communication or a Voice over IP communication. In many situations, a user desires to communicate with another user via a communication network in a secure manner so that information exchanged via the communication network cannot be intercepted or even manipulated by a third party. In a conventional communication system, a user having a client device has the possibility to select a specific way to communicate with another user, however, for most users it is unknown which of the available communication services provides protection against attacking or manipulation of information exchanged between the user and another user via the communication network. Since the user has no knowledge about the available security provided by different communication applications present at his client device, the user will in many circumstances not select the most suitable communication application for communicating with another user.

Accordingly, there is a need to provide a communication system which overcomes these drawbacks and which provides a safe communication between users.

SUMMARY OF THE INVENTION

The invention provides according to a first aspect a communication system for providing secure point-to-point communication comprising a communication network, a first client device and a second client device configured to communicate with each other via said communication network, wherein each of the first and second client devices is adapted to run a selected communication application using a communication service provided by said communication network to communicate with each other, wherein the communication application which provides the highest communication service security level is selected from a group of communication applications using communication services with different communication service security levels and being available on the first and second client devices.

In a possible embodiment of the communication system according to the first aspect of the present invention, the first client device is configured to select automatically the communication application available at the first client device providing the highest communication service security level to establish a communication link to the second client device via the communication network of said communication system.

In a further possible embodiment of the communication system according to the first aspect of the present invention, the first client device is configured to run the selected communication application to communicate with the second client device via the communication network of said communication system, if the communication link is successfully established by the communication application selected by the first client device.

In a still further possible embodiment of the communication system according to the first aspect of the present invention, the first client device is configured to select automatically another communication application available at the first client device providing the same communication service security level or the next communication service security level, if the communication link is not established by the communication application selected by the first client device.

In a further possible embodiment of the communication system according to the first aspect of the present invention, the communication service security level of the established communication link is indicated by means of a user output interface of said first and second client devices to the respective users.

In a still further possible embodiment of the communication system according to the first aspect of the present invention, the communication between the first and second client devices through the established communication link is initiated in response to enablement commands input by the users by means of user input interfaces of said first and second client devices.

In a possible embodiment of the communication system according to the first aspect of the present invention, the communication network comprises a telephone network and/or a data network.

The invention further provides according to a second aspect a client device for providing secure point-to-point communication via a communication network, said client device comprising an application execution unit adapted to run a selected communication application using a communication service provided by said communication network, wherein the communication application which provides the highest communication service security level is selected automatically from a group of available communication applications using communication services with different communication service security levels.

In a possible embodiment of the client device according to the second aspect of the present invention, the available communication applications comprise at least one Voice over IP application, at least one instant messaging application, at least one electronic mail application, at least one telephone service application, and at least one short message service application.

In a possible embodiment of the client device according to the second aspect of the present invention, the client device comprises a mobile device including a smartphone, a satellite phone or a laptop.

In a further possible embodiment of the client device according to the second aspect of the present invention, the client device comprises a terminal device including a computer terminal and a telephone terminal.

In a still further possible embodiment of the client device according to the second aspect of the present invention, the client device comprises an encryption device connected to a mobile device or to a terminal device via a wired or a wireless data interface.

The invention further provides according to a third aspect a method for providing secure point-to-point communication between client devices comprising the steps of:

selecting by a first client device a communication application which provides the highest communication service security level from a group of communication applications available on the first client device using communication services with different communication service security levels, and executing by the first client device the selected communication application to communicate with a second client device via a communication network using the communication service with the highest communication service security level.

BRIEF DESCRIPTION OF THE DRAWINGS

In the following, features, objects and advantages of the different aspects of the present invention will become evident for a man skilled in the art by means of a detailed description of embodiments of the present invention taken in conjunction with the figures of the enclosed drawings.

DETAILED DESCRIPTION OF EMBODIMENTS

Figure 1:
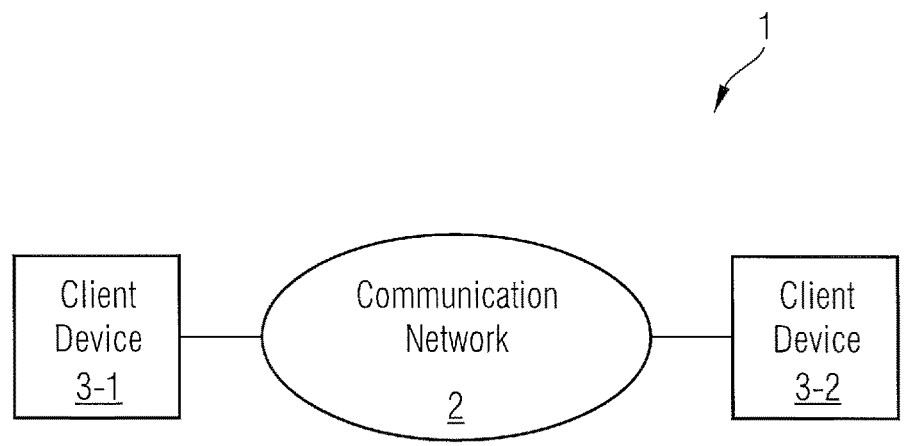
FIG. 1 shows a diagram for illustrating a possible exemplary embodiment of a communication system according to the first aspect of the present invention.

As can be seen in FIG. 1, the communication system 1 according to the first aspect of the present invention comprises a communication network 2. A plurality of client devices can be connected to the communication network 2. FIG. 1 illustrates a first client device 3-1 and a second client device 3-2 connected to the communication network 2 via a wired or wireless link. The communication network 2 can comprise a plurality of subnetworks. The communication network 2 of the communication system 1 comprises in a possible embodiment a telephone network and/or a data network. In the communication system 1 according to the first aspect of the present invention, each of the first and second client devices is adapted to run a selected communication application using a communication service provided by said communication network 2 to communicate with each other. The communication application which provides the highest communication service security level, CSSL, is selected from a group of communication applications using communication services with different communication service security levels and being available both on the first and second client devices 3-1, 3-2 illustrated in FIG. 1.

The client devices 3-$i$ illustrated in FIG. 1 can comprise mobile devices and/or terminal devices. The mobile devices include smartphones, satellite phones or laptops. The terminal devices can include computer terminals or telephone terminals. In a further possible embodiment, the client devices can also comprise specific encryption devices connected to a mobile device or to a terminal device via a wired or wireless data interface such as a Bluetooth.

Figure 6:
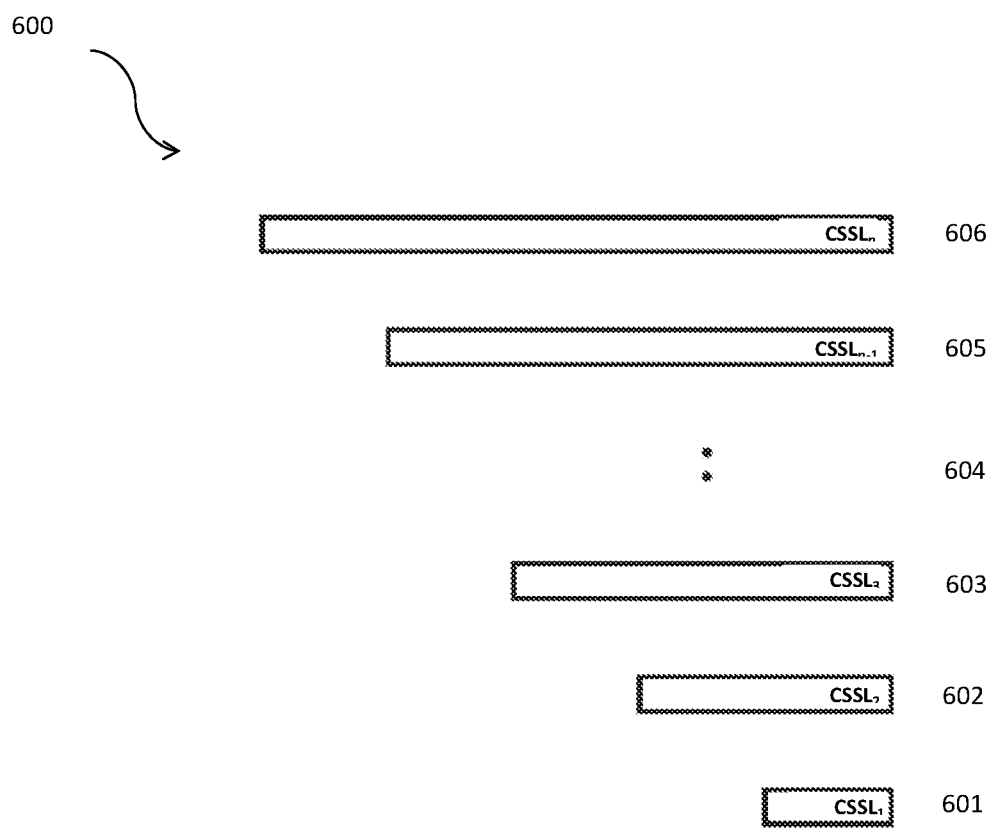
FIG. 6 shows a diagram for illustrating the operation of the method and system for providing secure point-to-point communication according to the present invention.

For providing a secure point-to-point communication between the client devices, the first client device 3-1 can be configured to select automatically the communication application available at the first client device 3-1 which provides the highest communication service security level CSSL to establish a communication link to the second client device 3-2 via the communication network 2 of the communication system 1. Different communication applications available at the first client device 3-1 can comprise different communication service security levels. The communication service security level CSSL depends on the type of communication application, i.e. whether it is a telephone service application, a Voice over IP application, an instant messaging application, an electronic mail application, or a short message service application. Further, the communication security service level CSSL of the available communication application depends on the specific communication protocol used by the respective communication application. In a possible embodiment, the client device 3-$i$ can comprise one or several Voice over IP applications, one or several instant messaging applications, one or several electronic mail applications, one or several telephone service applications and one or several short message service applications. These different communication applications can be displayed in a possible embodiment to the user of the client device 3-$i$. Each type of communication application can comprise communication applications using different communication protocols providing different levels of security. Moreover, each communication application of a specific type can be encrypted by different encryption algorithms using encryption keys of different length. Consequently, for a secure point-to-point communication, a plurality of different communication applications of different types with different security levels are available. In a possible embodiment, to each available communication application a corresponding communication service security level CSSL such as illustrated in FIG. 6 is assigned. In a possible embodiment, for all communication applications available in the client device 3-$i$ a corresponding communication service security level CSSL is stored in a lookup table (600). FIG. 6 shows many different communication service security levels (601, 602, 603, 604, 605, 606), where the length of a bar in the lookup table (600) illustrated in FIG. 6 corresponds to the strength of the security level. The different communication service security levels range from the lowest security level CSSL1 (601) to the highest available security level $CSSL_n$ (606) within a client device 3-$i$.

In a possible embodiment, if a user of a first client device 3-1 selects secure point-to-point communication, the control unit of the first client device is configured to select automatically the communication application available at the first client device 3-1 providing the highest communication service security level CSSL using a lookup table stored in a memory of the client device 3-1. The control unit of the first client device 3-1 evaluates the lookup table to find the communication application having the highest communication service security level $CSSL_n$ as illustrated in FIG. 6. It is possible that the control unit of the first client device finds several different communication applications of the same or different types providing this highest communication service security level $CSSL_n$. The control unit of the first client device 3-1 tries then to establish a communication link to the second target client device 3-2 via the communication network 2 of said communication system 1 using one of the available communication applications with the highest service security level $CSSL_n$. If the communication link can be successfully established by the selected communication application because this communication application is also available at the remote target client device 3-2, the first client device 3-1 is configured to run the selected communication application to communicate with the second client device 3-2 via the communication network 2 of the communication system 1.

In contrast, if the communication link is not established by the communication application selected by the first client device 3-1, the first client device 3-1 is configured to select automatically another communication application available at the first client device 3-1 providing the same communication service security level $CSSL_n$ or the next highest communication service security level $CSSL_{n-1}$.

For example, if the first client device 3-1 comprises a Voice over IP application with a service security level $CSSL_n$ and an instant messaging application with a service security level $CSSL_{n-1}$, the control unit of the first client device 3-1 first tries to establish a communication link with the second client device 3-2 using the Voice over IP application. If this communication link can be successfully established by the selected communication application, i.e. the Voice over IP application of the first client device 3-1, the first client device 3-1 is configured to run the selected communication application, i.e. the Voice over IP application, to communicate with the second client device 3-2 via the communication network 2. However, if the communication link cannot be established by the selected Voice over IP application of the first client device 3-1, the control unit of the first client device is configured to select automatically another communication application having the same or the next highest communication service security level, i.e. in the given example the instant messaging application available at the first client device 3-1. With the selected instant messaging application the control unit of the first client device 3-1 tries then again to establish a communication link with the remote target client device 3-2. This can be repeated until the lowest service security level CSSL1 has been reached. For example, a communication link may be only successfully established with a lower security level such as security level $CSSL_3$. In a possible embodiment, the communication service security level CSSL of the established communication link can be indicated by means of a user output interface of the first client device 3-1 and by means of a user output interface of the second client device 3-2 to the respective users. Both users can then decide, whether the indicated communication service security level $CSSL_i$ offers enough security for the intended communication between both users. In a possible embodiment, communication between the first and second client devices via the established communication link is only initiated after corresponding enablement commands have been input by the users by means of user input interfaces of the client devices 3-1, 3-2. In this embodiment, only if both users are satisfied with the indicated service security level $CSSL_i$, the communication is performed via the established communication link using the selected communication application. In a still further possible embodiment another application can automatically decide whether the available communication since security level $CSSL_i$ offered by the communication application is sufficient for transmitting data via the communication network.

Figure 2:
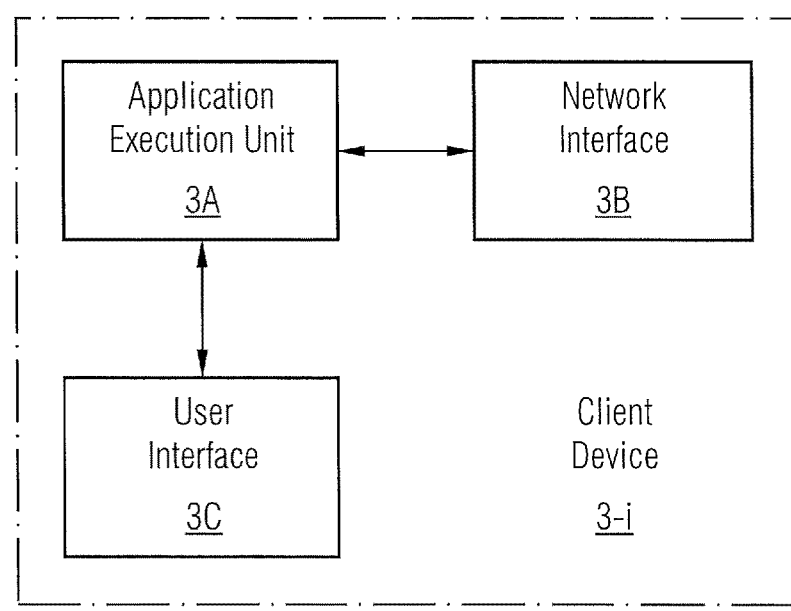
FIG. 2 shows a block diagram of a possible exemplary embodiment of a client device which can be used in a communication system as illustrated in FIG. 1.

FIG. 2 shows a block diagram of a client device 3-$i$ which can be used in a communication system 1 as illustrated in FIG. 1. In the shown embodiment, the client device 3-$i$ comprises an application execution unit 3A, a network interface 3B and a user interface 3C. The application execution unit 3A is adapted to run a selected communication application using a communication service provided by the communication network 2. The communication application which provides the highest communication service security level CSSL is selected automatically by the application execution unit 3A from a group of available communication applications using communication services with different communication service security levels CSSLs. The application execution unit 3A has in a possible embodiment access to a memory of the client device 3-$i$ storing a lookup table indicating different communication applications with different communication service security levels $CSSL_i$. The client device 3-$i$ illustrated in FIG. 2 can be a mobile device including a smartphone, a satellite phone or a laptop. The client device 3-$i$ can in an alternative embodiment also be a terminal device including a computer terminal or a telephone terminal. The client device 3-$i$ comprises a network interface 3B that allows connection to a communication network 2 as shown in FIG. 1. The user interface 3C can comprise an output user interface which has a display and/or an input user interface for inputting commands of the user. The user interface 3C can be in a possible embodiment a graphical user interface.

Figure 3:
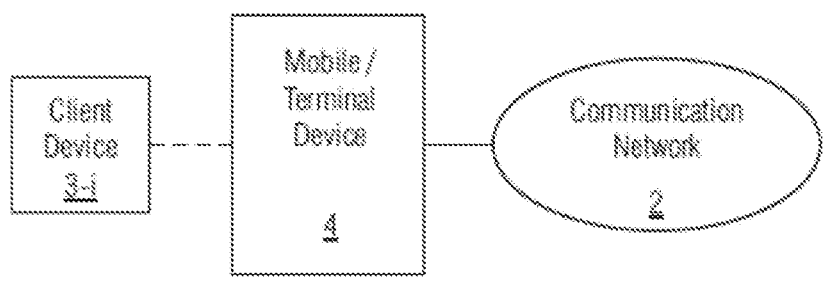
FIG. 3 shows a further block diagram for illustrating a possible exemplary embodiment of a client device connected to a communication network via a terminal device.

FIG. 3 shows a further possible embodiment of a client device 3-$i$. In the shown embodiment, the client device 3-$i$ is formed by an encryption device connected to another mobile or terminal device 4 via a wired or wireless data interface as illustrated in FIG. 3. In a possible embodiment, the client device 3-$i$ can be connected to the other device 4 via a Bluetooth wireless interface. The mobile/terminal device 4 illustrated in FIG. 2 can also comprise a user interface comprising for instance a microphone and loudspeakers. For instance, the device 4 can be formed by a smartphone having a microphone for inputting voice messages and loudspeakers to hear voice messages. In a possible embodiment, the user interface 3C of the client device 3-$i$ also comprises a microphone inputting voice and a loudspeaker outputting audio signals.

In a possible embodiment, the application execution unit 3A of the client device 3-$i$ illustrated in FIGS. 2, 3 can comprise an encryption unit adapted to encrypt the information or data by means of an encryption algorithm using an encryption key. In a possible embodiment, as soon as the wireless communication interface between the client device 3-$i$ and the other device 4 has been established, the user interface of device 4 is automatically deactivated. For instance, the microphone and loudspeakers of a mobile smartphone 4 are automatically deactivated as soon as the Bluetooth communication interface between the client device 3-$i$ and the device 4 has been set up. The application execution unit 3A of the client device 3-$i$ selects then the available communication application which provides the highest communication security level $CSSL_i$ to establish a communication link to the target client device 3-2 via the communication network 2. In a possible embodiment, the security level of the established communication link is displayed to the user of the client device 3-$i$ via the user interface 3C. If the displayed communication service security level CSSL is deemed by the user to be not sufficient, he may choose not to communicate via this communication channel with the other user. In a still further possible embodiment, the user may input a selection command via the user interface 3C of the client device 3-i to increase the security level CSSL by using a more sophisticated encryption algorithm and/or by using a longer encryption key. A further possible option for increasing the security level CSSL is the use of another communication application type (for instance Voice over IP application instead of a conventional telephone service application) and/or by using a different communication protocol for the respective communication application. In a possible embodiment, the user can input a user command indicating that the highest available communication service security level CSSL is requested no matter what type of communication application, what protocol and what encryption algorithm or encryption key is employed. In this scenario, the application execution unit 3A can automatically select the available communication application of the safest type using the safest communication protocol available, employing the most secure encryption algorithm with the longest encryption key. If a communication link with these settings cannot be established, the application execution unit 3A will step by step decrease the security level CSSL by selecting another communication application of a different type and/or by using a different protocol until the communication link with the target client device 3-2 can be successfully established. In this way, it is guaranteed that always the highest possible communication service security level CSSL will be used for communication between both users.

The communication system 1 provides tap-proof end-to-end communication with a client device such as smartphones, satellite phones or personal computers. Consequently, companies or government authorities can share confidential information with the highest possible security level. Moreover, the users do not have to make a decision of their own which communication application or communication channel they wish to use for the communication. The selection of the safest and most secure communication application is performed automatically by the application execution unit 3A of the client device 3-i. The client device 3-i can be used whenever a conversation or communication needs to be confidential. In a possible embodiment, the application execution unit 3A of the client device 3-i can be implemented on a trusted hardware platform.

In a possible embodiment, the used security level CSSL can be displayed to the user of the client device 3-i. The indicated security level confirms to the user that a secure communication link has been established. In a possible embodiment, also the type of the most secure communication application can be indicated to the user. For instance, a user can be informed whether the safest available communication application is a text communication application or a voice communication application. In a possible embodiment, the user can select between the safest text communication application and the safest available voice communication application. If the user selects for instance the safest available voice communication application, he can start talking after the selection. In contrast, if the user selects the safest available text communication application, the user can start to type in the communication message using a keypad of the user interface 3C of the client device 3-i.

In a possible embodiment, the data transmitted can be encrypted by an encryption unit of the application execution unit 3A using an encryption key. In a possible embodiment, a hash value can be generated during the key exchange. This hash value is different for each connection established between the client devices. The purpose of the displayed hash value is to eliminate the possibility of a man-in-the-middle attack. If a user of a client device has the suspicion that he is exposed to a man-in-the-middle attack, he and the other user can compare the hash values shown on their client devices at the start of the communication to ensure that the indicated hash values are identical. The encryption unit of the client device 3-i is configured to encrypt outbound signals and to decrypt inbound signals.

In a possible embodiment, the available communication applications comprise at least one Voice over IP application. This Voice over IP application can be implemented in various ways using different proprietary protocols such as a session initiation protocol SIP, a real time transport protocol RTP or a real time transport control protocol RTCP, a secure real time transport protocol SRTP or a session description protocol SDP.

The communication applications can also comprise instant messaging applications. Instant messaging offers a real time text transmission over the communication network 2 such as the internet. The exchange of messages is performed in real time. The communication applications can also comprise electronic mail applications (email), telephone service applications or short message service, SMS, applications. Short message service communication uses text messaging via fixed line or mobile phone devices to exchange short text messages. These messages are sent to a short message service center SMC providing a store and forward mechanism. The short message service center SMC attempts to send the messages to at least one recipient. If a recipient is not reachable, the short message service center SMC can use the messages for a later retry.

Figure 4:
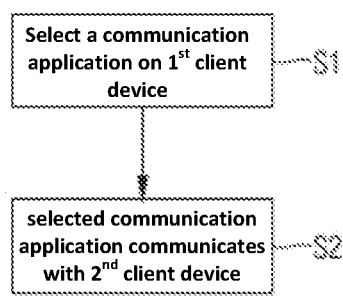
FIG. 4 shows a flowchart of a possible embodiment of a method for providing secure point-to-point communication between client devices according to a further aspect of the present invention.

FIG. 4 shows a flowchart of a possible exemplary embodiment of a method for providing secure point-to-point communication between client devices 3-i according to a further aspect of the present invention.

In a first step S1, the first client device 3-1 selects a communication application which provides the highest communication service security level CSSL from a group of communication applications available on the first client device 3-1 using communication services with different communication service security levels.

Then, the first client device 3-1 executes in step S2 the selected communication application to communicate with a second client device 3-2 via a communication network such as the communication network 2 illustrated in FIG. 1 using the communication service with the highest communication service security level CSSL.

Figure 5:
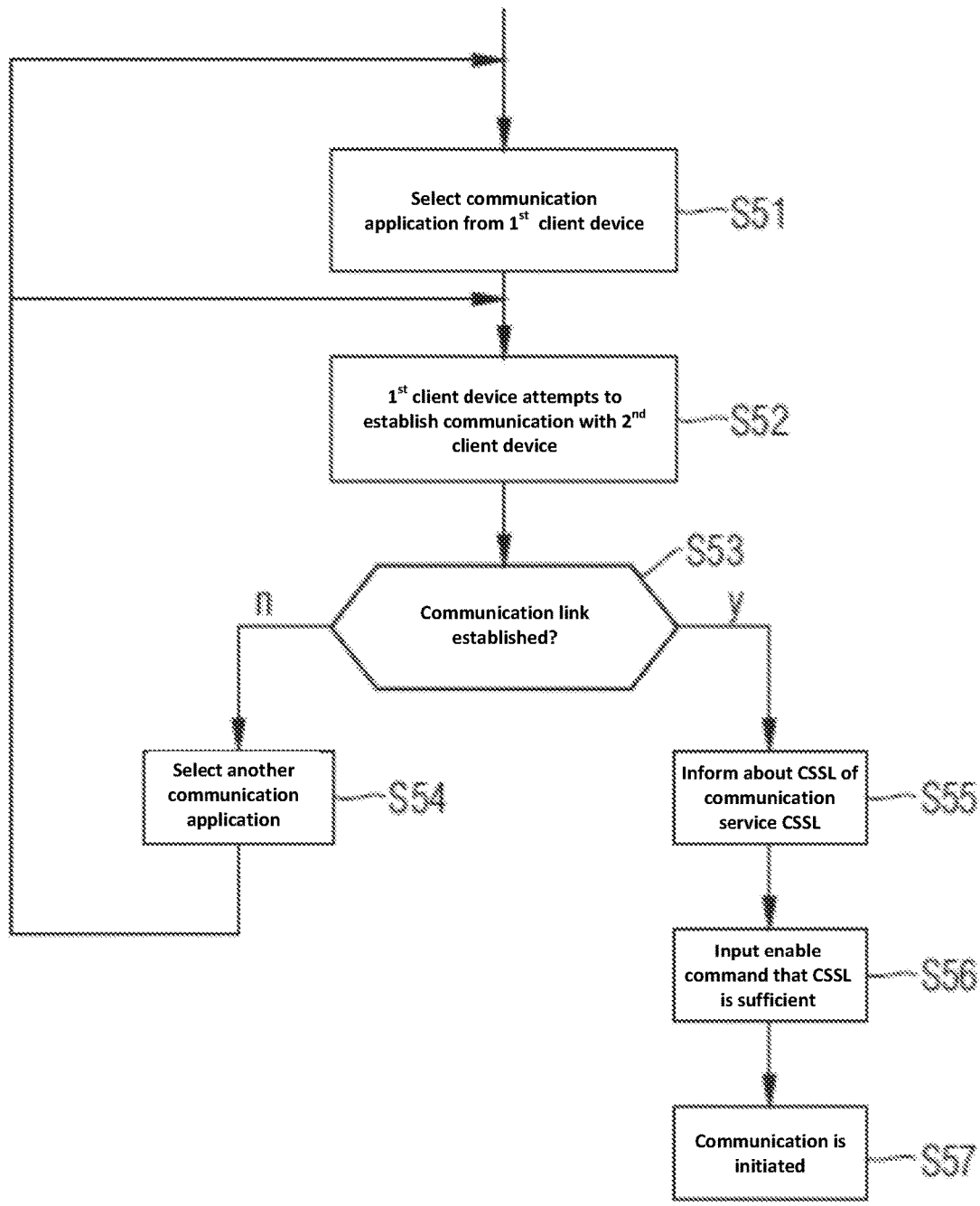
FIG. 5 shows a further more detailed flowchart for illustrating a possible exemplary embodiment of the method according to the present invention.

FIG. 5 shows a further flowchart illustrating a possible exemplary embodiment of the method for providing secure point-to-point communication between client devices according to the present invention.

In a first step S51, the first client device 3-1 selects from a group of communication applications available at the first client device 3-1 the communication application which according to a lookup table provides the highest communication service security level CSSL in a further step S52, the first client device 3-1 attempts to establish a communication link to the second client device 3-2 via the communication network 2 using the selected communication application.

In step S53, the application execution unit of the first client device 3-1 decides whether the communication link has been successfully established or not. If no communication link could be established by the selected communication application, the application execution unit of the first client device 3-1 selects in step S54 automatically another communication application available at the first client device 3-1 providing the same communication service security level $CSSL_n$ or the next highest communication security level $CSSL_{n-1}$. Then, the process returns to step S52 and the application execution unit of the client device tries again to establish a communication link. The loop is performed until in step S53 it is detected that a communication link could be successfully established and the process continues with step S55. In step S55, both users are informed about the communication service security level CSSL of the established communication link via the user interfaces of the client devices. In a possible embodiment, the users can input enablement commands in step S56 to indicate that the displayed security level CSSL is sufficient. In response to the received enablement commands, the communication between the first and second client devices through the established communication link is initiated in step S57 and the selected communication application is executed or run until one of the users does input a command to deactivate the communication.

The invention claimed is:

1. A communication system for providing secure point-to-point communication comprising:
   a communication network,
   a first client device and a second client device,
   wherein each of the first and second client devices is adapted to run a selected communication application using a communication service provided by said communication network to communicate with each other,
   wherein the first client device comprises a control unit, said control unit configured to select from a group of communication applications using communication services with different communication service security levels, wherein the different communication service security levels for the group of communication applications are stored in a lookup table, and the lookup table being available on the first and second client devices, the communication application which provides the highest communication service security according to the lookup table, wherein said first client device is an encryption device configured to encrypt outgoing audio signals or decrypt incoming audio signals,
   a mobile device connected to the first client device via a wired or a wireless data interface, wherein said first client device is configured to communicate via the mobile device, the mobile device being configured to provide the communication link between the first client device and communication network, and via the communication network with the second client device,
   wherein the first Client device is configured to select automatically the communication application available at the first client device providing the highest communication service security level according to the lookup table to establish communication link to the second client device via the mobile device and via the communication network of said system, and
   wherein if the communication link is not established by the communication application selected by the first client device the first client device is configured to select automatically another communication application available at the first client device according to the lookup table providing the same communication service security level or the next highest communication service security level, and the first client device is configured to repeat to select automatically another communication application available at the first client device according to the lookup table providing the same communication service security level or the next highest communication service security level until a communication link is established or the lowest security level has been reached,
   wherein the available communication applications comprise:
      at least one Voice over IP application,
      at least one instant messaging application,
      at least one electronic mail application,
      at least one telephone service application, and
      at least one short message service application.

2. The communication system according to claim 1, wherein if the communication link is successfully established by the communication application selected by the first client device, the first client device is configured to run the selected communication application to communicate with the second client device via the mobile device and via the communication network of said system.

3. The communication system according to claim 1, wherein the communication service security level of the established communication link is indicated by means of user output interfaces of said first and second client devices.

4. The communication system according to claim 3, wherein communication between the first and second client devices through the mobile device and the established communication link is initiated in response to enablement commands input by means of user input interfaces of said first and second client devices.

5. The communication system according to claim 1, wherein the communication network comprises a telephone network and/or a data network.

6. A client device for providing secure point-to-point communication via a communication network,
   said client device being a first client device and comprising a hardware processor,
   application execution software, which when executed by the hardware processor, causes the hardware processor to perform operations comprising running a selected communication application using a communication service provided by said communication network, and
   control software, which when executed by the hardware processor, causes the hardware processor to perform operations comprising selecting automatically from a group of available communication applications using communication services with different communication service security levels, wherein the different communication service security levels for the group of communication applications are stored in a lookup table stored on the first client device and a second client device, the communication application which provides the highest communication service security level according to the lookup table, and said first client device is an encryption device configured to encrypt outgoing audio signals or decrypt incoming audio signals,
   wherein said first client device is connectable to a mobile device via a wired or a wireless data interface, and
   wherein said first client device is configured to communicate via the mobile device, the mobile device being configured to provide the communication link between the first client device and communication network, and via the communication network with a second client device,
   wherein the first client device is configured to select automatically the communication application available at the first client device providing the highest communication service security level according to the lookup table to establish a communication link to the second client device via the mobile device and via the communication network of said system, and wherein if the communication link is not established by the communication application selected by the first client device the first client device is configured to select automatically another communication application available at the first client device according to the lookup table providing the same communication service security level or the next highest communication service security level, and the first client device is configured to repeat to select automatically another communication application available at the first client device according to the lookup table providing the same communication service security level or the next highest communication service security level until a communication link is established or the lowest security level has been reached, wherein the available communication applications comprise:
at least one Voice over IP application,
at least one instant messaging application,
at least one electronic mail application,
at least one telephone service application, and
at least one short message service application.

7. A method for providing secure point-to-point communication between client devices comprising the steps of:

selecting by a control unit of a first client device, wherein said first client device is an encryption device configured to encrypt outgoing audio signals or decrypt incoming audio signals, a communication application which provides the highest communication service security level from a group of communication applications available on the first client device using communication services with different communication service security levels, wherein the different communication service security levels for the group of communication applications are stored in a lookup table stored on the first client device and a second client device, and connecting the first client device to a mobile device via a wired or a wireless data interface;

executing by the first client device the selected communication application to communicate with a second client device via the mobile device, the mobile device being configured to provide the communication link between the first client device and communication network, and via a communication network using the communication service with the highest communication service security level according to the lookup table;

wherein communicating with the second client device is accomplished by attempting to establish a communication link with the second client device using the communication application with the highest communication security level according to the lookup table, and if no link can be established, attempting to establish a communication link with a different communication application having the next highest communication security level according to the lookup table, and repeating the attempt to establish a communication link at a next highest communication security level until a communication link is established or a lowest communication security level has been reached, wherein the available communication applications comprise:
at least one Voice over IP application,
at least one instant messaging application,
at least one electronic mail application,
at least one telephone service application, and
at least one short message service application.

* * * * *